INVENTORS.
GAYLORD G. OLSON,
STEVEN D. DORFMAN,
BY
J. K. Haskell
ATTORNEY.

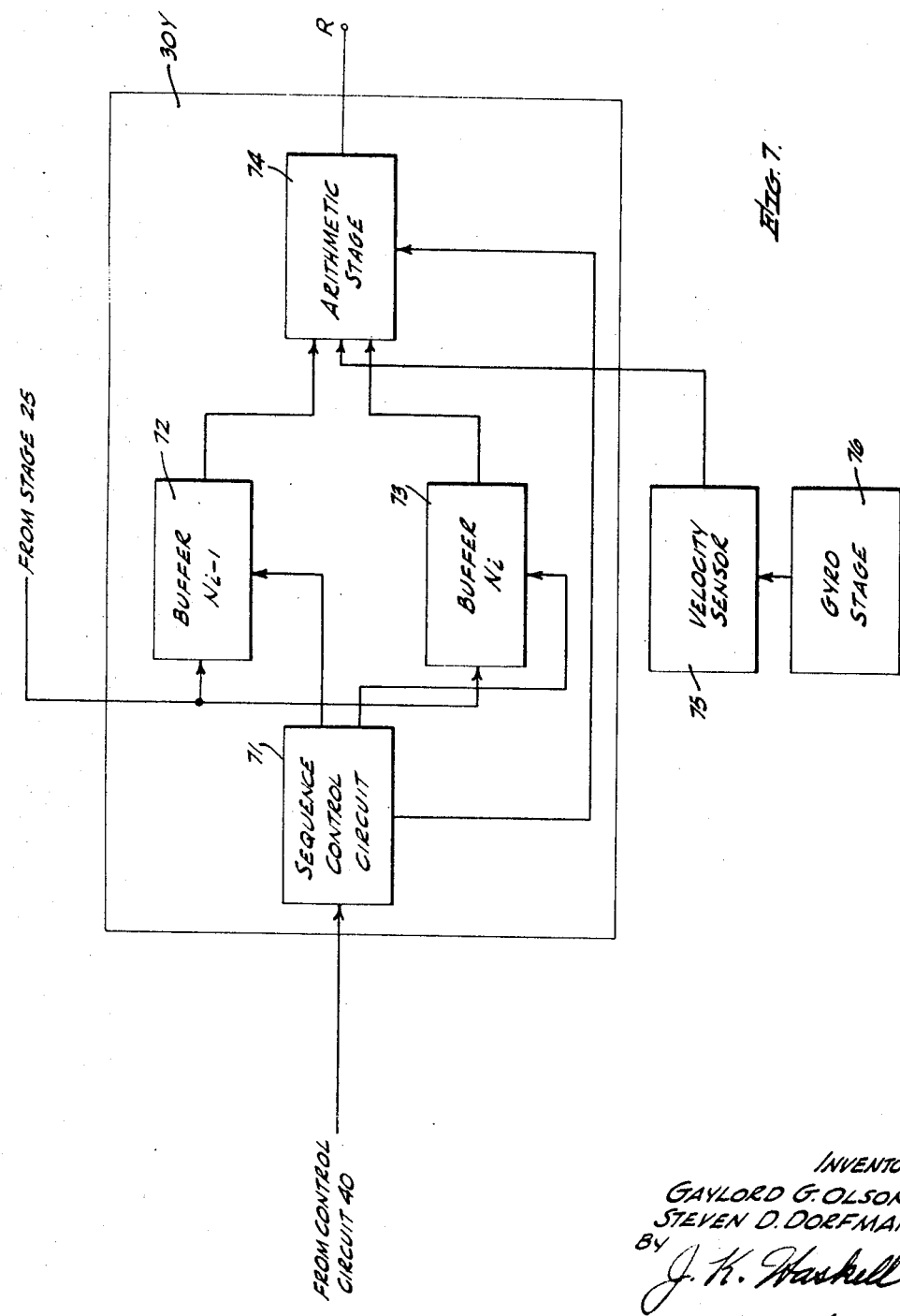

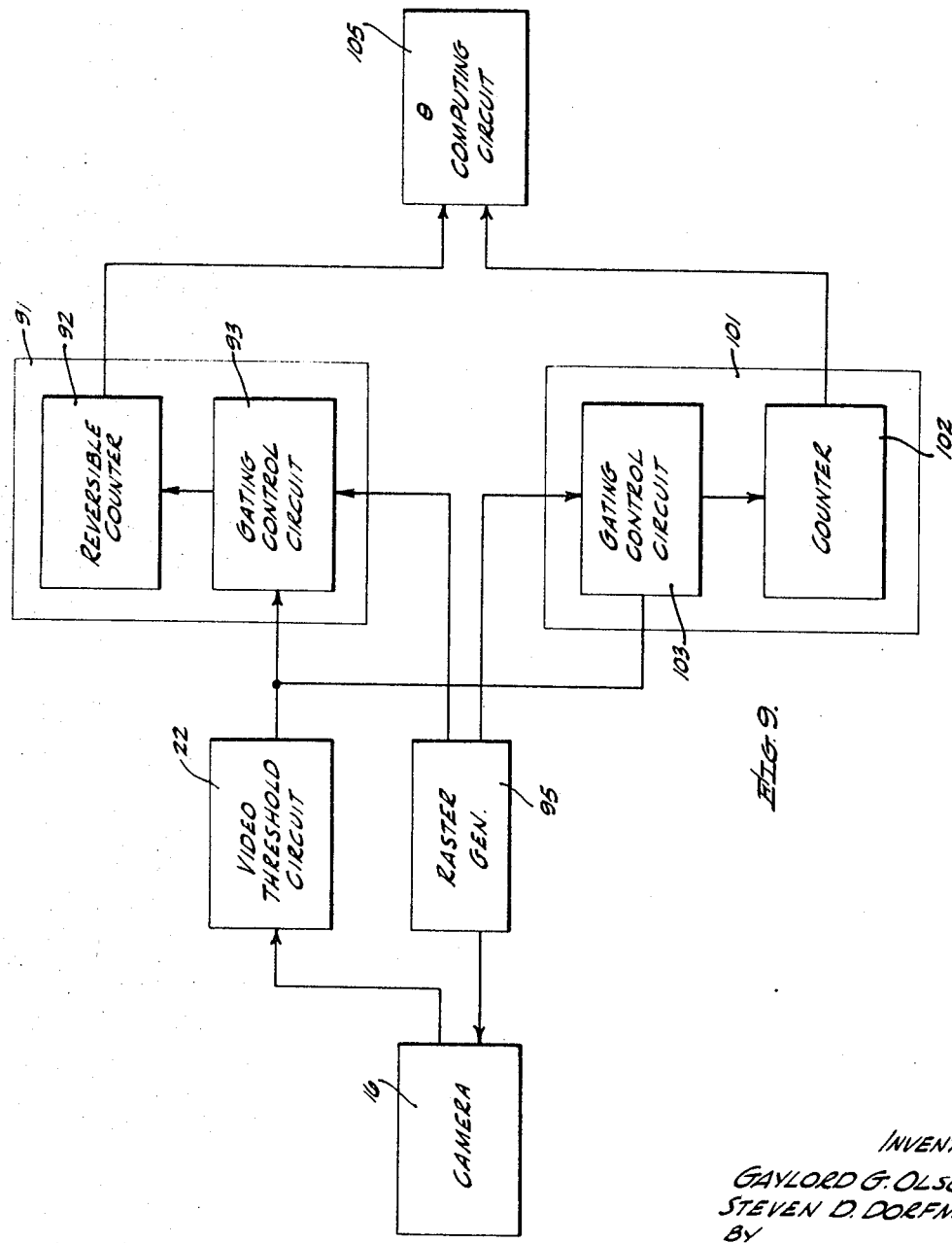

United States Patent Office 3,453,047
Patented July 1, 1969

3,453,047
RANGING SYSTEM
Gaylord G. Olson, Inglewood, and Steven D. Dorfman, Los Angeles, Calif., assignors to Hughes Aircraft Company, Culver City, Calif., a corporation of Delaware
Filed Oct. 22, 1965, Ser. No. 500,823
Int. Cl. G01c 3/08
U.S. Cl. 356—4                    17 Claims

ABSTRACT OF THE DISCLOSURE

The disclosed apparatus involves an airborne system for determining the range of a target object having an illuminated or radiating surface. The ranging is accomplished by measuring the solid angle subtended at the airborne system by the illuminated or radiating surface and sensing the relative acceleration of the object along a line of sight between the object and the airborne system. Signals representative of the solid angle and the relative acceleration are applied to a signal processor which arithmetically develops a signal representing the range of the object.

---

This invention relates to ranging instrumentation and particularly to an improved system for determining the range between two objects.

Various ranging systems have been developed to determine the range between objects which may be moving with respect to one another, or where one object is stationary and the others are in motion. Most of the systems are based on radar techniques which require relatively complex and expensive equipment of significant weight and volume. Because of such characteristics, extensive scientific research is directed to developing simpler and lighter ranging systems which can advantageously be incorporated in vehicles or objects in space as well as in vehicles traveling in the atmosphere. One of the major objectives in developing equipment for such vehicles or objects is that they be light, small and as uncomplex as possible so as to reduce the probability of failure and malfunctioning. Also, because of the limited space and weight capacity of many space and atmospheric vehicles, it is generally desired that systems be capable of performing more than one function so that the number of systems which need be installed on the vehicle is held to a minimum.

Accordingly, it is an object of the present invention to provide a novel ranging system.

Another object of the present invention is the provision of a new optical system for determining the range between two objects.

A further object of this invention is to provide a relatively simple optical system which is capable of determining the range between two objects as well as perform other functions related to the two objects.

Still another object of the invention is the provision of an optical ranging system which is particularly adapted for use in a space vehicle to control the relative position of the vehicle with respect to another object in space.

Still a further object is to provide a new optical ranging system capable of determining and/or maintaining the range between two objects in space as well as determine the rate of change therebetween.

These and other objects are achieved by providing a relatively simple system which is mountable aboard a first object, such as a space or atmospheric vehicle, to determine the range to a second object or target by sensing and measuring the effective surface area projected onto a sensitive surface from the second object as radiating energy such as light along a line of sight between the second object and the sensitive surface, such as the sensitive recording surface of a television camera included in the system aboard the vehicle. The range is determined without the need to measure the intensity of light directed by the second object to the camera. Rather, it is the changes in the effective surface area which are projected on the camera that are used to derive the range and changes thereof. The effective surface area refers to that area which is above some threshold brightness level.

In cases where the light directed by the target to the camera is reflected sunlight, the line of sight between the vehicle and the object must remain fairly fixed in inertial space. This condition may be necessary so that the angular relationship of the line of sight to the sun remains constant, and thereby does not affect the effective object area projected on the camera, except due to changes in range. In order to determine range without sunlight, the novel system may incorporate an infrared image tube which is sensitive to heat radiated from an effective area of the object's surface, similar to the sensitivity of the television camera to light reflected therefrom. In addition to sensing sunlight reflected from, or heat radiating from a target to determine the range therefrom, the system of the present invention may determine range by measuring the angular spacing between a plurality of light or energy sources purposely located on the object to cooperate in the determination of the range between the object and the ranging-system-carrying vehicle.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 3 is a simplified diagram for explaining the operation of a portion of the system diagrammed in FIGURE 2;

FIGURE 4 is an expanded block diagram of the conversion stage shown in FIGURE 2;

FIGURE 5 is a simplified diagram useful in explaining the principles of operation of another embodiment of the invention;

FIGURES 6 and 7 are block diagrams of a processor used in two different embodiments of the invention;

FIGURE 9 is a partial block diagram of another embodiment of the invention.

Figure 1:
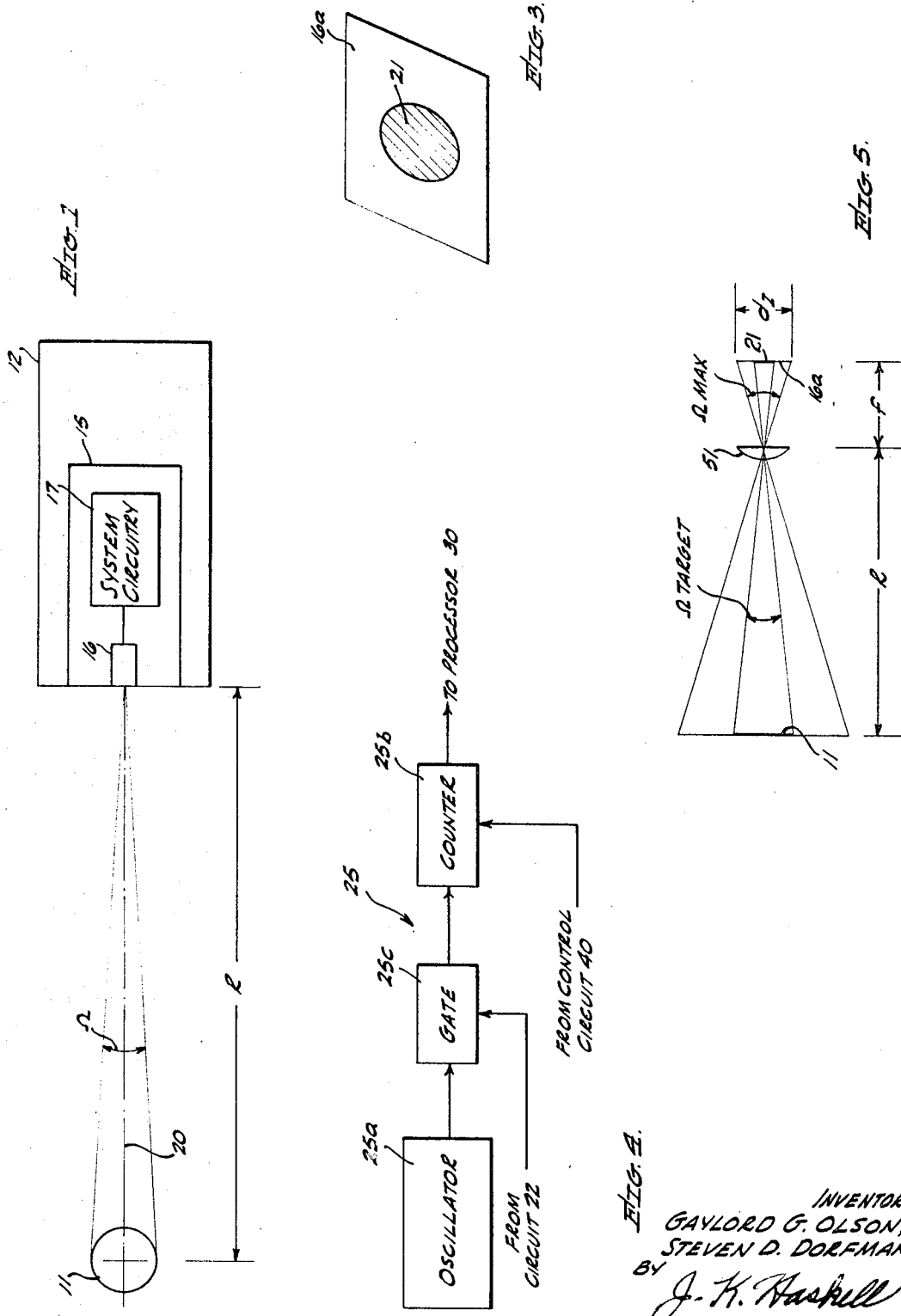
FIGURE 1 is a simplified diagram useful in explaining the principles of the present invention.

Attention is first directed to FIGURE 1 which is a simplified cross-sectional diagram useful in explaining the principles underlying the teachings of the invention. In the figure, numeral 11 designates an object or target which is shown at a distance or range R from an object, such as for example a space vehicle 12, in which a novel ranging system 15 of the present invention is mounted. The system 15 in its simplest form is shown comprising a camera 16 which is sensitive to light received from the target 11 and a range-determining stage 17, which responds to signals from the camera 16 to derive the range between the vehicle 12 and the object 11.

Let it be assumed that the target area projected perpendicular to a line-of-sight 20 is representable by the letter A, then the solid angle $\Omega$ which is subtended by the target area A at the camera 16 may be defined as $$\Omega = A/R^2 \tag{1}$$

where R is the range between objects 11 and 12.

Differentiating expression (1) with respect to time yields, $$\frac{d\Omega}{dt} = \frac{-2A}{R^3}\frac{dR}{dt} + \frac{1}{R^2}\frac{dA}{dt} \quad (2)$$

Dividing each term by $\Omega$ results in $$\frac{d\Omega}{dt}\bigg/\Omega = \frac{-2}{R}\frac{dR}{dt} + \frac{1}{A}\frac{dA}{dt} \quad (3)$$

The first and second terms of the right side of expression (3) represent the rate of change of range R per unit time and the rate of change of target area A per unit time respectively.

Since it is reasonable to assume that the rate of change of R is much greater than the rate of change of area A per unit time, expression (3) can be reduced to, $$\frac{d\Omega}{dt}\bigg/\Omega \cong \frac{-2}{R}\frac{dR}{dt} \quad (4)$$

or $$\frac{d\Omega}{dt} \cong \frac{-2\Omega}{R}\frac{dR}{dt} \quad (4a)$$

or $$\frac{dR}{dt} \cong \frac{-R}{2\Omega}\frac{d\Omega}{dt} \quad (4b)$$

Differentiating the expression (2) results in $$\frac{d^2\Omega}{dt^2} = \frac{6A}{R^4}\left(\frac{dR}{dt}\right)^2 - \frac{2A}{R^3}\frac{d^2R}{dt^2} - \frac{4}{R^3}\frac{dR}{dt}\frac{dA}{dt} + \frac{1}{R^2}\frac{d^2A}{dt^2} \quad (5)$$

Considering the first and third terms on the right side of expression (5) and dividing each of the terms by $$\frac{2A}{R^3}\frac{dR}{dt}$$

results in the terms of $$\frac{3}{R}\frac{dR}{dt}$$

and $$\frac{1}{A}\frac{dA}{dt}$$

respectively.

Since, herebefore it has been assumed that $$\frac{1}{R}\frac{dR}{dt}$$

is much greater than $$\frac{1}{A}\frac{dA}{dt}$$

therefore in expression (5), the third term $$\left(\frac{4}{R^3}\frac{dR}{dt}\frac{dA}{dt}\right)$$

may be neglected.

Also, multiplying the second and fourth terms by $R^2/A$, the second term reduces to $$\frac{2}{R}\frac{d^2R}{dt^2}$$

which represents the percentage change in range rate per unit time and the fourth term reduces to $$\frac{1}{A}\frac{d^2A}{dt^2}$$

which represents percentage change in area rate per unit time. Thus, in light of the foregoing assumptions, it is reasonable to assume that the second term is much larger than the fourth. Consequently, the third and fourth terms in the right side of expression (5) may be neglected, so that $d^2\Omega/dt^2$ may be expressed as, $$\frac{d^2\Omega}{dt^2} \cong \frac{2A}{R^3}\left[\frac{3}{R}\left(\frac{dR}{dt}\right)^2 - \frac{d^2R}{dt^2}\right] \quad (6)$$

Substituting $$\frac{-R}{2\Omega}\frac{d\Omega}{dt}$$

for $dR/dt$ in accordance with expression (4b) and $\Omega$ for $A/R^2$, expression (6) reduces to $$\frac{d^2\Omega}{dt^2} \cong \frac{2\Omega}{R}\left[\frac{3R}{4\Omega^2}\left(\frac{d\Omega}{dt}\right)^2 - \frac{d^2R}{dt^2}\right] \quad (7)$$

Solving for R, $$R \cong \frac{2\Omega\frac{d^2R}{dt^2}}{\frac{3}{2\Omega}\left(\frac{d\Omega}{dt}\right)^2 - \frac{d^2\Omega}{dt^2}} \quad (8)$$

The term $d^2R/dt^2$ represents the relative accelerations of the vehicle and target along the line of sight. Assuming that the target's velocity is constant even though not known, its acceleration is zero so that $d^2R/dt^2$ represents the acceleration of the vehicle.

It is thus seen that the range between target 11 and vehicle 12 can be determined by measuring the acceleration of the vehicle 12, measuring the solid angle $\Omega$ subtended by the target 11 at the camera at several instants of time and by deriving the first and second derivatives $d\Omega/dt$ and $d^2\Omega/dt^2$ with respect to a given time period. The first derivative $d\Omega/dt$ represents the rate of change of the solid angle per unit time or solid angle rate while the second derivative $d^2\Omega/dt^2$ represents the rate of change of the solid angle rate.

Assuming that the acceleration of the vehicle over a short time period $\Delta t$ is a constant, expression (8) may be rewritten as $$R \cong \frac{2\Omega\frac{d^2R}{dt^2}\Delta t}{\frac{3}{2\Omega}\left(\frac{d\Omega}{dt}\right)\left(\frac{d\Omega}{dt}\Delta t\right) - \frac{d^2\Omega}{dt^2}\Delta t} \quad (8a)$$

It should be noted that the range R is determined independent of the intensity of the received signals as long as they are above a certain minimum detectable threshold level. Rather R is derived by sensing the subtended solid angle using a camera's sensitive surface, the camera's acceleration and by deriving the first and second derivatives of the sensed solid angle.

Figure 2:
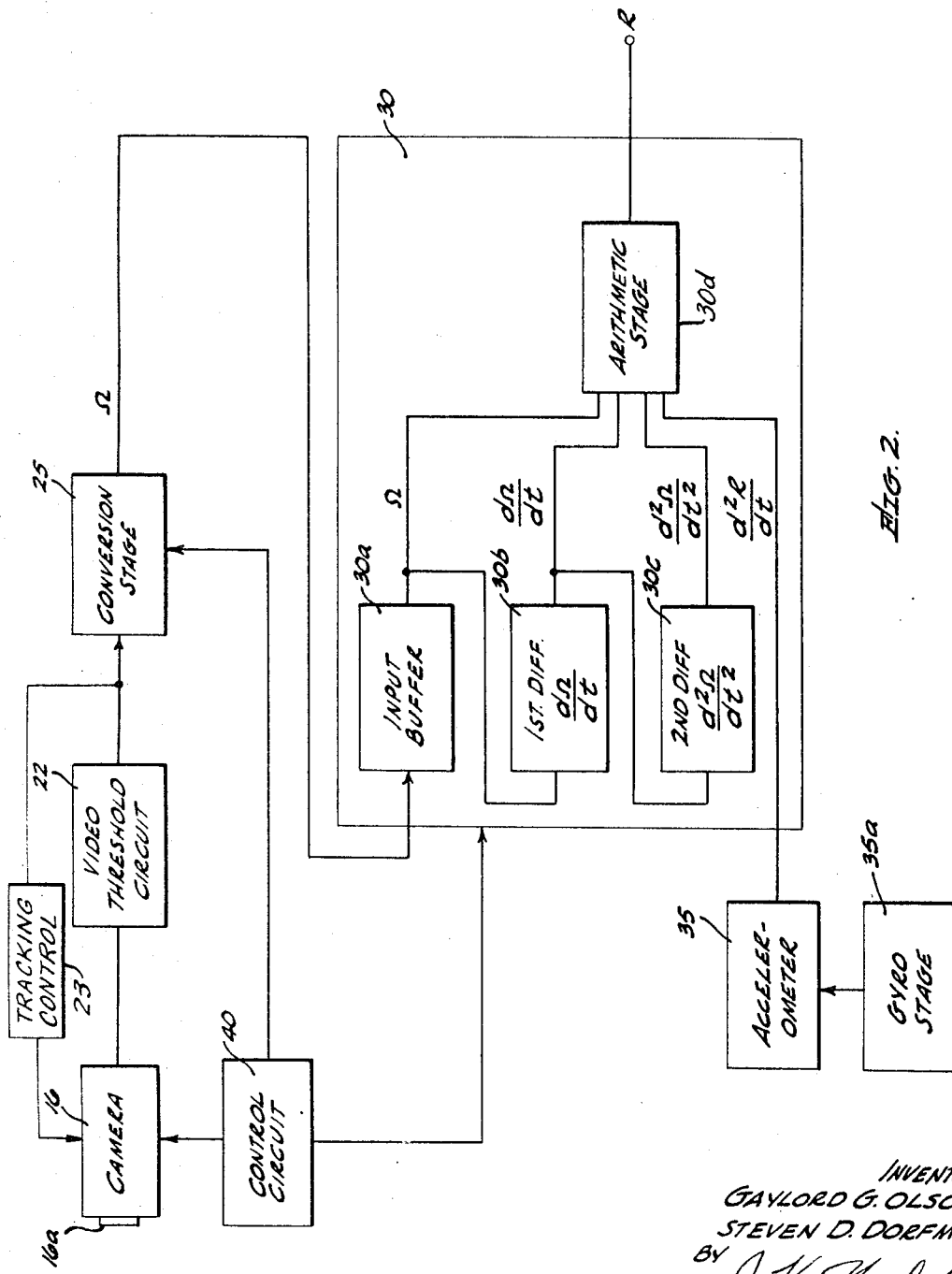
FIGURE 2 is a block diagram of one embodiment of the invention.

Reference is now made to FIGURE 2 which is a block diagram of one embodiment of the invention for deriving the range R in accordance with the teachings disclosed herebefore. The system includes the camera 16 which has a light-sensitive surface 16a onto which is projected the effective surface area of the target 11 (FIGURE 1). Let us assume that the surface 16a is as shown in FIGURE 3, to which reference is made herein, and that the target 11 subtends a solid angle $\Omega$, so that only the surface area designated by numeral 21 is illuminated by focusing the light projected from target 11 on the surface 16a with a suitable lens to be later discussed in greater detail. Let us further assume that the illumination of the entire area 21 is above a minimum threshold level as the surface 16a is scanned by the camera during each frame cycle or period. Only during the portion of the frame during which area 21 is scanned does the camera produce output video signals above a predetermined threshold level.

The output signals of the camera are supplied to a video threshold circuit 22 (FIGURE 2) which enables a conversion stage 25 only when the video signals are above the predetermined threshold, i.e. only during the portion of each frame when the area 21 is scanned. The conversion stage, one embodiment of which will be described hereafter in detail, produces an output signal which is proportional to the area 21 and therefore proportional to the subtended angle $\Omega$. The latter output signal is supplied to a special purpose computer or processor 30 in which the range R between target 11 and camera 16 is derived in accordance with expression (8).

The signal from stage 25, having an amplitude proportional to $\Omega$ is supplied at the end of each frame period to an input buffer 30a of processor 30 to be stored therein until the next signal is supplied at the end of a subsequent frame period. During the latter frame period, the stored signal representing $\Omega$ is supplied to a first differentiating circuit 30b which provides an output proportional to the rate of change of $\Omega$ in a predetermined time unit such as the frame period. Thus, the output of circuit 30b is $d\Omega/dt$. This output is supplied to a second differentiating circuit 30c, the function of which is to produce a signal which is equal to $d^2\Omega/dt^2$. In addition, the system includes an accelerometer 35 which senses the relative acceleration $d^2R/dt^2$ of the camera with respect to the target 11 in the direction of the line of sight 20, (FIGURE 1), and supplies a signal proportional thereto to the processor 30.

The signals from buffer 30a, circuits 30b and 30c and the accelerometer 35 are supplied to an arithmetic stage 30d. The latter stage includes various circuits necessary to perform arithmetic operations, such as multiplication, subtraction and division necessary to combine the various input signals to derive the range R in accordance with expression (8), which is rewritten for convenience, $$R \cong \frac{2\Omega \frac{d^2R}{dt^2}}{\frac{3}{2\Omega}\left(\frac{d\Omega}{dt}\right)^2 - \frac{d^2\Omega}{dt^2}}$$

The novel system of the present invention further includes a control circuit 40, the function of which is to synchronize the operation of the camera 16, the conversion stage 25 and the processor 30. For example, at the end of each scanning frame period, the control circuit 40 energizes the conversion stage 25 to transfer its output signal indicative of the solid angle subtended during a frame period to the input buffer 30a and store it there. Thereafter, the circuit 40 resets the stage 25 as well as the camera for the next scanning frame period during which processor 30 performs the various computational operations based on the signal stored in the buffer 30a. When the ranging system of the invention is incorporated in a space exploration vehicle, the control circuit 40 may be included in the vehicle's master control circuit which is used to control the operations of the various systems aboard the vehicle. Similarly, the operation of processor 30 may be included in any properly programmed general purpose computer in the vehicle. Techniques of synchronizing the operation of several stages in a system are well known in the art.

Reference is now made to FIGURE 4 which is a block diagram of one embodiment of the conversion stage 25. As seen, the stage is shown comprising a free running oscillator 25a which is connected to a counter 25b through a gate 25c. Prior to the beginning of each frame period, the counter is reset by a signal from the control circuit 40. Then during the frame period, the counter is in condition to count up the signals or cycles supplied by the oscillator 25a. However, gates 25c is enabled to permit the signals of oscillator 25a to be counted up only when the video signals from the camera 16 (FIGURE 2) are above the threshold level of circuit 22, i.e. only during the portion of each frame during which an illuminated area related to the subtended solid angle is scanned. Thus the count in counter 25b at the end of each frame is proportional to the subtended solid angle $\Omega$.

Assuming that when the entire surface area 16a is illuminated, the count is $N_{max}$, then it is appreciated that the count after scanning area 21 may be expressed as $$N_{21} = N_{max} \cdot \frac{A_{21}}{A_{max}}.$$

where $A_{21}$ represents the area designated by numeral 21 and $A_{max}$ is the total area of surface 16a (FIG. 3). Since both $N_{max}$ and $A_{max}$ are constants, it is seen that $N_{21}$ is proportional to the area $A_{21}$ which in turn a function of the solid angle $\Omega$.

Referring to FIGURE 5, let it be assumed that the camera has a circular surface of diameter $d_I$ and that optical means, such as a lens 51 of focal length $f$ is used to focus the light directed to the surface 16a. It follows that the maximum solid angle $\Omega_{max}$ subtendable by the surface 16a at the lens 51 is proportional to $(d_I/f)^2$.

Similarly a target 11 having, for example, a diameter $d_T$ and at a range R from the lens 51 will subtend a solid angle $\Omega$ target at the lens 51 which solid angle $\Omega_{target}$ is equal to $A_{21}/f^2$ and proportional to $(d_T/R)^2$.

In that $A_{21}$ can be readily determined as previously explained, and $f$ can be considered as a constant, $\Omega_{target}$ can be measured.

From the foregoing discussion it also follows that $$\frac{\Omega_{target}}{\Omega_{max.}} = \left(\frac{d_T}{d_I}\frac{f}{R}\right)^2 \tag{9}$$

or $$\Omega_{target} = \Omega_{max.}\left(\frac{d_T}{d_I}\frac{f}{R}\right)^2 \tag{10}$$

Since both solid angle $\Omega_{target}$ and $\Omega_{max}$ may be represented by the actual and maximum number which conversion stage 25 (FIGURES 2 and 4) may provide when operated in a digital mode, expression (10) may be rewritten as $$N_{target} = N_{max.}\left(\frac{d_T}{d_I}\frac{f}{R}\right)^2 \tag{11}$$

where $N_{target}$ represents the output number provided by stage 25 when a solid angle $\Omega_{target}$ is subtended at the lens 51 of camera 16. If the diameter $d_T$ of the target 11 is known all the terms in the right-hand side of expression (11) are constant except the range R and these terms can be represented by a constant K so that expression (11) becomes $$N_{target} = K\frac{1}{R^2} \tag{12}$$

or $$R = \left(\frac{K}{N_{target}}\right)^{1/2} \tag{13}$$

From expression (13), it is thus seen that when the diameter $d_T$ which is incorporated in the constant K is known, the range between the target and the camera can be derived by simply determining the number obtained from stage 25 at the end of a predetermined measuring period, such as the camera frame period, and calculating the right-hand term of expression (13). If however the target diameter is not known, the range may be derived in accordance with expression (8) by deriving the terms $d\Omega/dt$ and $d^2\Omega/dt^2$ from the measured values for $\Omega$.

Let us assume that the camera frame period is $\Delta t$ and that at the end of three successive periods, the numbers provided from the conversion stage 25 are $N_1$, $N_2$ and $N_3$ corresponding to subtended solid angles $\Omega_1$, $\Omega_2$, and $\Omega_3$. Then to a first approximation, $d\Omega/dt$ may be expressed as $$\frac{d\Omega}{dt} \cong \frac{\Omega_2 - \Omega_1}{\Delta t} \cong \frac{\Omega_3 - \Omega_2}{\Delta t} \cong \frac{N_2 - N_1}{\Delta t} \cong \frac{N_3 - N_2}{\Delta t} \tag{14}$$

and also $$\frac{d^2\Omega}{dt^2} \cong \frac{\Omega_3 - 2\Omega_2 + \Omega_1}{(\Delta t)^2} \cong \frac{N_3 - 2N_2 + N_1}{(\Delta t)^2} \tag{15}$$

Substituting the right-hand terms for the left-hand functions in expression (8), the range R for the frame period when $N_2$ is obtained may be expressed as $$R \cong \frac{4N_2^2 \frac{d^2R}{dt^2}(\Delta t)^2}{N_1N_2+(N_2)^2+N_2N_3-3N_1N_3} \quad (16)$$

From expression (16), it is seen that to a first approximation, range R may be derived by performing arithmetic operations on the term $d^2R/dt^2$ which as herebefore defined represents the acceleration of the camera 16 along the line of sight and on the three numbers $N_1$, $N_2$ and $N_3$ received at the end of three successive frame periods $\Delta t$. Thus the processor 30 (FIGURE 2) may be considerably simplified by eliminating the two differentiating circuits 30b and 30c and replacing the input buffer 30a with three buffers so that the three successively supplied numbers $N_1$, $N_2$ and $N_3$ may be stored therein. This is necessary so that the numbers be simultaneously supplied to an arithmetic stage to perform the operations in accordance with expression (16).

Figure 6:
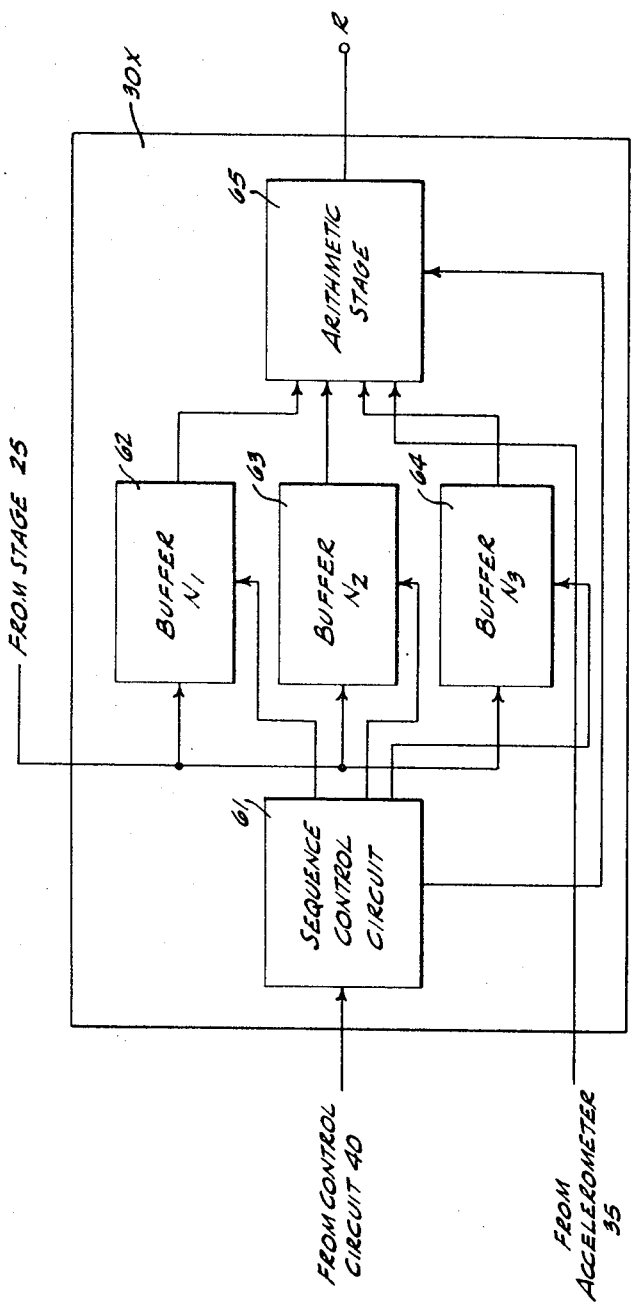

One embodiment of a processor for performing the operations in accordance with this expression is diagrammed in block form in FIGURE 6, being designated by numeral 30x. The processor is shown including a sequence control circuit 61 which is responsive to signals from the control circuit 40 (FIGURE 2) indicating the ends of successive frame periods to control the storing of successive numbers $N_1$, $N_2$ and $N_3$ supplied from the conversion stage 25 in buffers 62, 63 and 64, respectively. Then at the end of the third period when $N_3$ is stored in buffer 64, circuit 61 energizes an arithmetic stage 65 which is also supplied with a signal $d^2R/dt^2$ from accelerometer 35 to perform the operations in accordance with expression (16).

In the foregoing, the novel ranging system of the present invention has been described in conjunction with embodiments in which the range is determined in accordance with expression (8) in which it is assumed that the acceleration term $d^2R/dt^2$ represents only the measurable acceleration of the vehicle on which the camera is mounted, with acceleration of the target being assumed as zero due to its constant velocity which need not be known. If however, the target's velocity is not constant, so that its acceleration is not zero, the term $d^2R/dt^2$ is assumed to represent the relative acceleration along the line of sight 20 (FIGURE 1).

The teachings of the present invention need not be limited to deriving the range as a function of relative acceleration between the objects. Rather the relative velocity of the two objects may be used to determine the range. For example, expression (8a), which is rewritten for convenience, $$R \cong \frac{2\Omega \frac{d^2R}{dt^2}\Delta t}{\frac{3}{2\Omega}\frac{d\Omega}{dt}\left(\frac{d\Omega}{dt}\Delta t\right)-\frac{d^2\Omega}{dt^2}\Delta t} \quad (8a)$$

may be integrated to yield $$R \cong \frac{2\Omega \Delta \frac{dR}{dt}}{\frac{3\Delta\Omega}{2\Omega}\frac{d\Omega}{dt}-\Delta\frac{d\Omega}{dt}} \quad (17)$$

Dividing each of the denominator's terms by $d\Omega/dt$ and comparing the absolute values, it is reasonable to assume that $$\left|\frac{\Delta\Omega}{\Omega}\right| \ll \left|\frac{\Delta\frac{d\Omega}{dt}}{\frac{d\Omega}{dt}}\right| \quad (18)$$

Therefore, the first denominator term in expression (17) may be neglected so that the expression may be reduced to, $$R \cong \frac{-2\Omega\Delta\frac{dR}{dt}}{\Delta\frac{d\Omega}{dt}} \quad (19)$$

$\Delta\frac{dR}{dt}$ represents an induced relative velocity increment and $\Delta\frac{d\Omega}{dt}$ is an incremental change in the rate of change of the subtended solid angle, due to acceleration.

Substituting $N_i$ for $\Omega$ and $$\frac{N_i - N_{i-1}}{\Delta t}$$

for $d\Omega/dt$, expression (19) may be written as, $$R_i \cong -\frac{(2N_i)\left(\frac{dR}{dt}\Delta t\right)}{N_i - N_{i-1}} \quad (20)$$

where $N_i$ and $N_{i-1}$ are the numbers received at the end of two successive frame periods $\Delta t$.

Since term $dR/dt$ represents the relative velocity in the direction of the line of sight between the vehicle and the target, and since the velocity of the target is assumed to be known, $dR/dt$ may be conveniently derived by sensing the velocity of the vehicle with a velocity sensing transducer and combining the velocity value with the known target velocity to provide a signal which is related to $dR/dt$. Such a signal together with the two successively produced numbers $N_i$ and $N_{i-1}$ may then be supplied to an arithmetric stage of a processor 30Y, shown in block diagram form in FIGURE 7, to which reference is made herein, to derive the range R in accordance with expression (20).

As seen from FIGURE 7, the processor 30Y comprises a sequence control circuit 71, similar in operation to circuit 61 of FIGURE 6. Circuit 71, in response to successive end-of-frame signals from control circuit 40, successively energizes buffers 72 and 73 to respectively store numbers $N_{i-1}$ and $N_i$ which are supplied thereto from stage 25 at the end of two successive frame periods $i-1$ and $i$. Then at the end of frame period $i$, the sequence control circuit 71 energizes an arithmetic stage 74. The function of the latter stage is to receive the numbers $N_{i-1}$ and $N_i$ stored in buffers 72 and 73 respectively, as well as a relative velocity indicating signal $dR/dt$ from a velocity sensor or transducer 75 which indicates the relative velocity along the line of sight between the vehicle and the target, and to perform the arithmetic operations necessary to derive the range R in accordance with expression (20). It should be appreciated that any known devices for sensing velocity may be employed. Also the relative velocity may be derived by utilizing the accelerometer 35 and integrating the output thereof to derive a signal representing the rate of change of the range R.

From the foregoing, it should thus be appreciated that in accordance with the teachings disclosed herein, the range R between a vehicle carrying the novel ranging system of the invention and a target may be determined by measuring the solid angle subtended by the target at the camera 16 (FIG. 1) which forms a part of the system. If the diameter of the target $d_T$, perpendicular to the line of sight is known, then the range may be derived in accordance with expression (13). If the target's diameter is not known, but the relative acceleration of the vehicle and target along the line of sight is measurable, such as by the accelerometer 35 (FIGURE 2), then the range may be derived in accordance with expressions (8) or (16). If on the other hand the relative velocity between the vehicle and target is known, the range may be derived in accordance with expression (20).

It is appreciated by those familiar with the art that if the subtended solid angle is produced by sunlight reflected by the target onto the camera, it is important that the line of sight remain fairly well fixed in inertial space, so that the angular relationship to the sun remains constant, thereby insuring that changes in the subtended solid angle are due to range changes and not changes in the reflected light. Furthermore, it is important that the accelerometer 35 respond only to acceleration in the direction of the line of sight and that it not respond to rotation of the vehicle about the line of sight and/or the acceleration thereof in other directions. This may be accomplished by incorporating in the ranging system a gyroscope stage 35a shown in FIGURE 2 which will correct the output of the accelerometer 35 to be indicative only of the relative acceleration in the direction of line of sight. Similar arrangements may be employed with the velocity sensor transducer 75 to insure that the signal supplied to processor 30Y (FIGURE 7) represents only the relative velocity in the direction of the line of sight between the vehicle and the target. Such an arrangement is represented in FIGURE 7 by the gyro stage 76.

The novel ranging system of the invention also includes a tracking control stage 23 shown in FIGURE 2 as responding to the output of video threshold circuit 22 to adjust the camera 16 to track the target 11 (FIGURE 1) so that it is at all times in the center of the field of view. Thus the novel system disclosed herein, in addition to determining the range to the target 11, may also be used as a tracking means which may continuously track the target and maintain it in the center of the camera's field of view. Any known tracking techniques may be employed in stage 23. Such techniques are quite well known in the art and therefore need not be described in detail. For example, a video tracking arrangement is described in an article entitled "TV Camera Tracker," by T. L. Poppelbaum, published in "Electronics" of Apr. 26, 1963. Another tracking system is described in an article "Automatic TV Tracker Keeps Eye on Missiles" by John R. Kruse, published in "Space Electronics Magazine" on Apr. 6, 1964.

In the foregoing, the invention has been described in connection with a camera having a light-sensitive surface on which the effective surface area of a target is projected to enable measurement of the solid angle subtended by said effective surface area at said camera. However, it should be appreciated that the invention need not be limited to the use of a camera in that the camera, for example, may be replaced by an infrared image tube having a heat-radiation sensitive surface which is senstive to radiated heat rather than light. Thus the camera 16 shown in FIGURE 2 should be interpreted in its broadest scope to include any means, such as the infrared image tube at which the effective surface area of a target may subtend a solid angle as a function of its size and distance from the camera, changes in the subtended solid angle being used to sense the changes in range.

Herebefore, the novel ranging system of the invention has been described in conjunction with a target which does not actively cooperate in the range determination. The target does not provide light from light sources which are purposely installed in the target for range finding. Rather, the target in the foregoing description is assumed to perform a passive role in that the effective surface area thereof reflects sunlight or radiates heat which is projected towards the camera of the ranging system. In accordance with the teachings of the present invention, the target may include light sources which are specifically installed on it for range finding purposes. For example, two light sources may be installed on the target on a line which is preferably perpendicular to the line of sight. The two light sources may be sensed as two spots on the light-sensitive surface 16a (FIGURE 2). By measuring the angular spacing between them and changes thereof, the range may be determined. In such an embodiment, the range is derived in terms of a linear angle $\theta$ rather than the solid angle $\Omega$. $\theta$ may be defined as $$\theta = 2\sqrt{\frac{\Omega}{\pi}} \qquad (21)$$

so that $$\Omega = \pi \frac{\theta^2}{4} \qquad (22)$$

Figure 8:
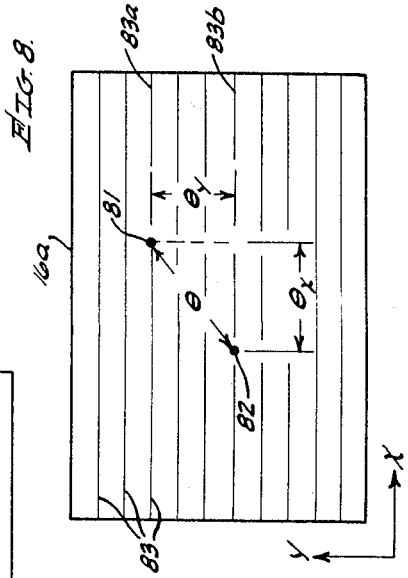
FIGURE 8 is a front view of a light-sensitive surface useful in explaining the operation of another embodiment of the invention.

For a better understanding of the technique of determining the range by measuring the spacing between two light spots on the surface 16a which are directed thereto from two light sources purposely mounted on the target, reference is made to FIGURE 8 which is a simplified diagram of surface 16a. Let us assume that spots or light points 81 and 82 directed from the target 11 are focused onto the light-sensitive surface 16a, the spacing between the points being designated at $\theta$. It is appreciated then that as the range between the target and surface 16a varies, the value of $\theta$ varies, similar to the variations of the solid angle $\Omega$ which are a function of changes in range. Thus, by measuring the value of $\theta$ during a predetermined time period and utilizing expression (22), the related value for the solid angle $\Omega$ may be obtained.

Various known techniques may be employed to measure the value of $\theta$ during each time period. For example, assuming that the surface 16a is scanned by a raster pattern of parallel lines 83 during each frame period, $\theta$ may be measured by deriving the spacings between the points along two mutually perpendicular axes X and Y. In FIGURE 8, the spacing along the X axis is designated $\theta_x$ and $\theta_y$ represents the spacing in the vertical Y axis. The particular technique will depend on the particular raster pattern used to scan surface 16a in order to sense any areas or points thereon which are illuminated by light directed thereto. Irrespective however of the technique used, the spacing $\theta$ between the two points may be measured during each frame period. The measured value $\theta$ may then be converted in accordance with expression (22) to provide the value $\Omega$ which may then be used to determine the range R in accordance with any one of the different expressions herebefore defined and explained.

One example of an arrangement for deriving the distance between the two points 81 and 82 is diagrammed in FIGURE 9 to which reference is made herein. As seen, the arrangement includes a stage 91 in which the term $\theta_x$ indicating the distance between points 81 and 82 along the X axis is derived. Stage 91 includes a reversible counter 92 to which signals are supplied through a gating control circuit 93. The signals are received from a raster generator 95 which produces the parallel line raster pattern comprising of lines 83 shown in FIGURE 8. The circuit 93 is controlled by the output of the video threshold circuit 22, so that when the first point 81 is sensed, the counter 92 counts up in a first direction until the end of the scanning line 83a on which point 81 is sensed. Thus at the end of line 83a, the count in counter 92, with respect to a reference count, represents the distance between point 81 and the end of the raster pattern. Then when point 82 is sensed on a line 83b, the counter is activated to count down until the end of line 83b so that the difference between the reference count and the final count represents the distance $\theta_x$.

Similarly, a stage 101 is used to derive the term $\theta_y$, comprises a counter 102 and a gating control circuit 103. The latter circuit is enabled by the sensing of the first point 81 to enable the counter 102 to count the number of lines succeeding line 83a. Then when sensing the second point 82 on line 83b, the circuit is disabled so that the count in counter 102 represents the number of scanning lines 83 between lines 83a and 83b which indicate the distance $\theta_y$ between points 81 and 82 in the Y axis. The outputs of stages 91 and 101 may then be supplied to a circuit 105 in which the distance $\theta$ between points 81 and 82 is computed. It should be appreciated that if each point intersects or is sensed on more than one scanning line, known techniques may be employed to control the actuation of the gating control circuits 93 and 103 only in response to one of the lines.

It should be appreciated that once the range R is derived, the range information may be utilized for any desired purpose. For example, it may be utilized to control the range between the two objects to be relatively constant. This may be accomplished by varying the velocity and its direction of at least one of the objects to maintain the two objects at a predetermined range. Although in the foregoing description the invention has been described in conjunction with a target and a space vehicle, it is appreciated that the teachings may be employed for determining the range between any two objects so long as at least one of the objects is moving, so that changes in the angle subtended on the other object may be measured.

There has accordingly been shown and described herein a novel ranging system for determining the range between two objects. When light directed to one of the objects is used for the determination of range, the subtended angle is utilized rather than the intensity of the light. Since the system is based on measuring changes in subtended angle, the system is quite sensitive to the determination of range when the range is quite small. Such a sensitivity is most important for space vehicle rendezvous. In addition, the novel system may be utilized for tracking an object or target as well as determining the range thereto, thereby concurrently performing two functions which, in prior art systems, require two separate systems.

It is appreciated that those familiar with the art may make modifications in the arrangements as shown without departing from the true spirit of the invention. Therefore, all such modifications and/or equivalents are deemed to fall within the scope of the appended claims.

What is claimed is:

1. A system for determining the range between first and second objects comprising:
   first means mountable on said first object including a heat sensitive surface, said surface being disposed substantially perpendicular to a line of sight between said first and second objects;
   second means for providing signals representing the solid angle subtended by said second object at said first means by detecting the portion of said heat sensitive surface illuminated by energy projected from said second object;
   third means for providing signals indicative of the relative motion of said first object with respect to said second object; and
   signal processing means operatively coupled to said second means and said third means for providing a signal representative of the range between said first and second objects.

2. The system defined in claim 1 wherein the signals provided by said third means represent the relative acceleration of said first object with respect to said second object along the line of sight between said first and second objects and said signal processing means includes storage means for storing signals from said second means, differentiator means operatively coupled to receive said signals from said second means for differentiating said signals from said second means with respect to a unit time and arithmetic means operatively coupled to said storage means, said differentiator means and said third means for determining the range between said first and second objects.

3. The system defined in claim 1 wherein the signals provided by said third means represent the acceleration of said first object with respect to said second object along said line of sight and said signal processing means includes storage means for storing signals provided by said second means at successive predetermined time periods and arithmetic means operatively coupled to said storage means and said third means for determining the range between said first and second objects.

4. A system for determining the range of an object having a surface area the image of which is provided by energy projected therefrom, said system comprising:
   angle sensing means for providing a first signal representative of the solid angle subtended at said system by said surface area from which energy is projected;
   accelerometer means for providing a second signal representative of the relative acceleration of said object along a line of sight between said object and said system; and
   processor means responsive to said first signal and said second signal for providing a third signal representative of the range of said object.

5. The apparatus defined by claim 4 wherein said angle sensing means comprises:
   a detector means including a medium having an exposed energy responsive surface onto which said image is projected for generating output signals in response to said energy projected from said surface area; and
   conversion means responsive to said output signals for providing an indication of the area of said image on said energy responsive surface wherein said area of said image is proportional to said solid angle.

6. The apparatus defined by claim 5 wherein said system further comprises means for continually orienting said detector means to have said exposed energy responsive surface substantially positioned in a plane orthogonal to said line of sight.

7. The apparatus defined by claim 5 wherein said conversion means comprises:
   oscillator means for continually providing cyclic signals having predetermined cycles;
   counter means for counting the cycles of said cyclic signals when applied thereto; and
   gating means responsive to said output signals for selectively applying said cyclic signals to said counter means.

8. The apparatus defined by claim 4 wherein said processor means comprises:
   storage means, operatively coupled to said angle sensing means, for storing said first signal;
   first differentiator means, operatively, coupled to said storage means, for providing a signal representative of the first derivative of said first signal with respect to time;
   second differentiator means, operatively coupled to said differentiator means, for providing a signal representative of the second derivative of said first signal with respect to time; and
   arihmetic means, responsive to signals applied by said storage means, said first differentiator means, said second differentiator means and said accelerometer means, for arithmetically generating said third signal representative of the range of said object.

9. The apparatus defined by claim 8 wherein said arithmetic means includes means for arithmetically generating said third signal in accordance with the expression $$R \simeq \frac{2\Omega \left(\frac{d^2 R}{dt^2}\right)}{\frac{3}{2\Omega}\left(\frac{d\Omega}{dt}\right)^2 - \frac{d^2\Omega}{dt^2}}$$

where R represents the range of said object, $\Omega$ represents the measured solid angle, $d\Omega/dt$ represents the signal provided by said first differentiator means, $d^2\Omega/dt^2$ represents the signal provided by said second differentiator means and $d^2R/dt^2$ represents the signal provided by said accelerometer means.

10. The apparatus defined by claim 4 wherein said processor means comprises:

a plurality of storage means, each operatively coupled to said angle sensing means, for storing said first signal provided at successive predetermined time periods; and arithmetic means, responsive to said stored first signals and said second signal applied simultaneously, for arithmetically generating said third signal representative of the range of said object.

11. The apparatus defined in claim 10 wherein said arithmetic means includes means for arithmetically generating the said third signal in accordance with the expression $$R_2 \cong \frac{4N_2^2 \frac{d^2R}{dt^2} (\Delta t)^2}{N_1 N_2 + (N_2)^2 + N_2 N_3 - 3N_1 N_3}$$

where $N_1$, $N_2$ and $N_3$ represent the signals provided at the end of first, second and third successive predetermined time periods, each of a duration $\Delta t$, $R_2$ represents the range during said second time period and $d^2R/dt^2$ represents the signal from said accelerometer means.

12. A system for determining the range of an object having a surface area the image of which is provided by energy projected therefrom, said system comprising:

angle sensing means for providing a first signal representative of the solid angle subtended at said system by said surface area from which energy is projected;

means for providing a second signal representative of the relative velocity of said object along a line of sight between said object and said system; and processor means responsive to said first signal and said second signal for providing a third signal representative of the range of said object.

13. The apparatus defined by claim 12 wherein said angle sensing means comprises:

detector means including a medium having an exposed energy responsive surface onto which said image is projected for generating output signals in response to said energy projected from said surface area; and conversion means responsive to said output signals for providing an indication of the area of said image on said energy responsive surface wherein said area of said image is proportional to said solid angle.

14. The apparatus defined by claim 13 wherein said conversion means comprises:

oscillator means for continually providing cyclic signals having predetermined cycles;

counter means for counting the cycles of said cyclic signals when applied thereto; and gating means responsive to said output signals for selectively applying said cyclic signals to said counter means.

15. The apparatus defined by claim 14 wherein said system further comprises means for continually orienting said detector means to have said exposed energy responsive surface substantially positioned in a plane orthogonal to said line of sight.

16. The apparatus defined by claim 15 wherein said processor means comprises:

first and second storage means each operatively coupled to said angle sensing means for storing said first signal provided at first and second successive times; and arithmetic means responsive to said stored first signal and said second signal applied simultaneously for arithmetically generating said third signal representative of the range of said object.

17. The system defined in claim 16 wherein said arithmetic means includes means for arithmetically generating the range of said object in accordance with the expression $$R \cong \frac{2N_i \frac{dR}{dt} \Delta t}{N_i - N_{i-1}}$$

where R represents the range of said object, $N_{i-1}$ and $N_i$ represent the signals provided at the end of two successive predetermined time periods, each of duration $\Delta t$, and $dR/dt$ represents the velocity indicating signals from said motion sensing means.

References Cited

UNITED STATES PATENTS 3,218,909  11/1965  Fain.

RONALD L. WIBERT, *Primary Examiner.*

V. P. McGRAW, *Assistant Examiner.*